Patented Aug. 10, 1926.

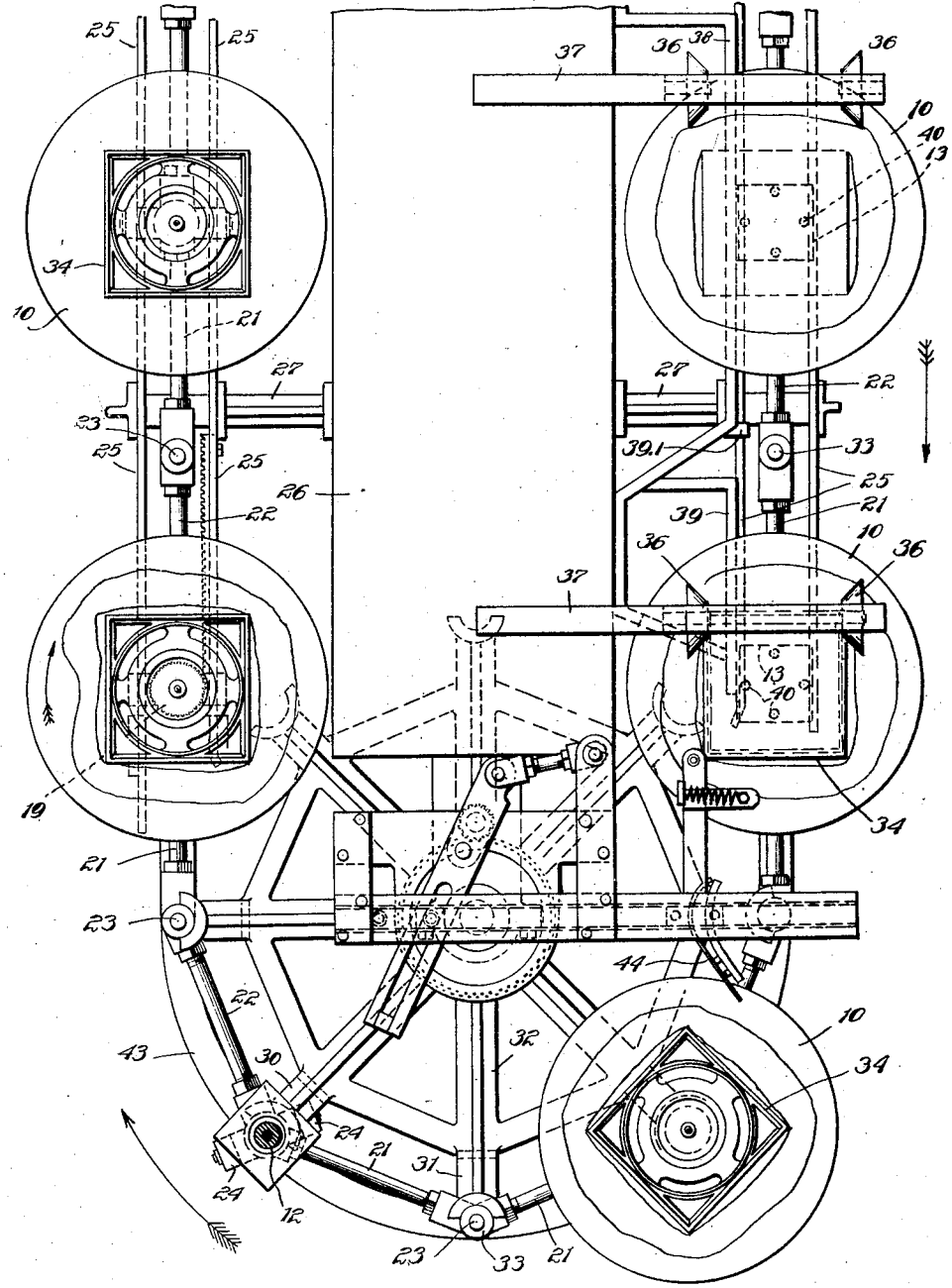

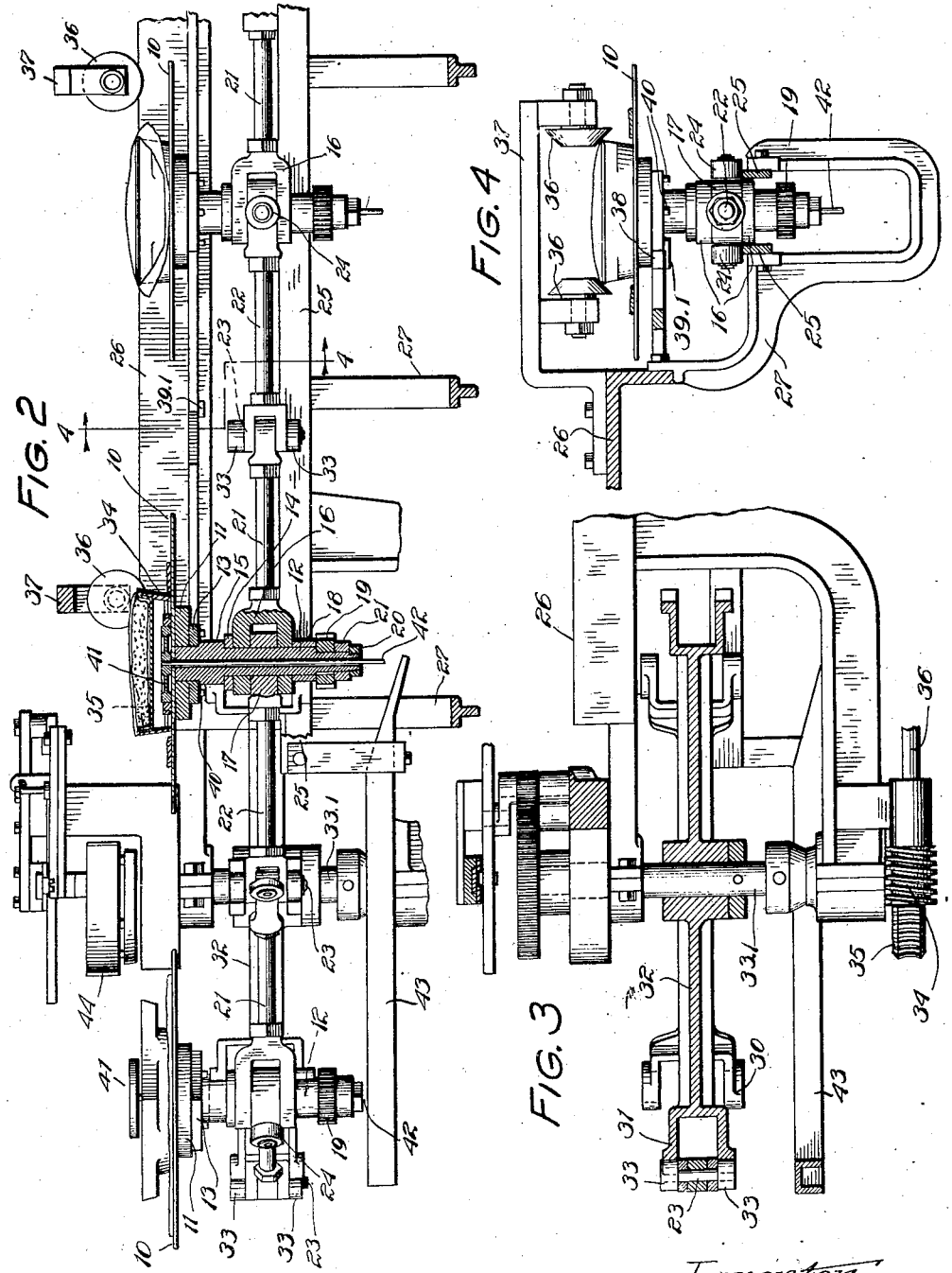

1,595,427

UNITED STATES PATENT OFFICE.

DENNIS W. SMITH, OF WILMETTE, ILLINOIS, ASSIGNOR TO COLBORNE MANUFACTURING COMPANY, OF CHICAGO, ILLINOIS, A CORPORATION OF ILLINOIS.

PIE MACHINE.

Application filed October 7, 1925. Serial No. 61,021.

This invention relates to improvements in pie machines wherein pies are formed on a train of supports moving in a horizontal plane, and more particularly relates to improved means for completing the operation by trimming the pies and ejecting them from the machine, in conjunction with improved carrier means for moving the pies in proper relation to the finishing devices. The improvements are particularly adapted for finishing square pies such as are desirable for use in slot machines. Heretofore in continuously operating pie machines the pies have been trimmed by devices which move with the pie for a short distance, during which period the pie is rotated with respect to the trimmer. The pies were carried on supports which were rotatably mounted on holders attached to a conveyer chain, as shown in Patent No. 1,397,272, Nov. 15, 1921. Or the holders were connected by links which were separately pivoted to the holders as in Patent No. 1,507,800, Sept. 9, 1924.

The main objects of this invention are to provide simplified means for trimming pies; to provide improved conveying means for carrying the pies in operative relation with the trimming and other processing devices, which means are less complicated and less subject to stretching than prior forms, and move the pies in more perfect timing relation with such processing devices, and which support the pies more rigidly and accurately.

An illustrative embodiment of the invention is shown in the accompanying drawings in which:

Figure 1 is a fragmentary plan view of the finishing and delivery end of the pie machine.

Fig. 2 is a side elevation viewed from the right side of Fig. 1 with parts in section.

Fig. 3 shows the end portion of Fig. 2 with parts omitted and parts shown in section.

Fig. 4 is a section on 4—4 of Fig. 3.

In this machine the pie supports, or carriers, comprise a circular disc upon which is mounted a cast iron form or pie holder. The supports are set on posts which are linked together to form a continuous chain which is supported at the sides of the machine by rails and rollers which are journaled on some of the links, and is supported at the ends and driven by horizontal sprocket wheels which engage at the joint portions of the chain. The supports move in the same horizontal plane along the sides of the machine and around the ends.

As the holders are moving around the starting end of the machine, which is not shown in the drawings, pie tins are set in the forms; the lower crust is rolled out and laid in place; the filler put in; and the top crust rolled out and laid over the whole; in the same manner as has been done heretofore. This leaves the pie completely formed but with the edges of the crust overhanging the support. Then the operation is finished by trimming the pie and ejecting it from the machine as will now be described.

As shown in the drawings, the circular disc 10 is riveted to the disc 11 which is mounted on the shouldered upper end 15 of the vertical post 12 immediately above the square cam member 13. A ring 14 is placed under the shouldered portion 15 and above the fork 16 which embraces the tongue member 17 to form a hinged support in which the post 12 is free to rotate. The spacer tube 18 is loose on the post under the fork 16 and rests on the gear wheel 19 which is keyed against a shoulder on the post and held in place by the nut 20 through the spacer ring 21, which also serves to hold the complete assembly in place on the post 12.

The pie carriers thus formed are linked together by the rods 21 and 22 which are hinged together on the vertical joint pin 23, the rods 21 being rigidly connected in the fork members 16 and the rods 22 rigidly connected in the members 17.

The support rollers 24 are journaled on either side of the members 17 and run on the rails 25 which support the chain of pie carriers on either side of the machine frame 26 to which the rails are secured by suitable hangers 27, and the lower portions of the forks 16 lie between the rails, as shown in Fig. 4, and serve as the lateral guides.

It is now apparent that, by means of the conveyer construction just described, the pie carriers are supported and guided along the sides of the machine in a very substantial manner; and the construction is extremely simple and practical for manufacturing and assembling. Also the distance between carriers may be adjusted to be the same in each instance and will remain as adjusted because the parts are strong and because the wear at the joints is negligible. Therefore, the carriers will move in accurate relation to the operation performing devices that are stationed along the path of travel.

At the end of the frame 26, the rails 25 are terminated and the joints in the chain are engaged by forks 30 and 31 in periphery of the horizontal wheel 32 which is fixed on the shaft 33.1 supported from the frame 26, and driven through the worm 34 and gear 35 from the drive shaft 36.

The larger forks 30 engage the portions 15 and the collars 18 on the posts 12 and the lower surfaces of the forks 16 and the upper surfaces of the collars 14 fit closely between the arms of the forks, providing a rigid support. The smaller forks 31 engage the rollers 33 provided on the ends of the joint pins 23.

The square forms or pie holders 34 are doweled in position in the centers of the discs 10 and the pie tins 35 fit into the holders with the flanges resting on the upper edges of the holders.

The trimming apparatus comprises two pairs of trimming rollers 36 which are rotatably mounted on the spaced supports 37 adjacent to the delivery end of the machine as shown in Fig. 1 and Fig. 2. And the pies are alined for trimming by means of the cams 13 and the cam rails 38 and 39 which are fastened to the frame 26. The square cams 13 are fixed on the posts 12 with the sides parallel to the sides of the pie holders and, as a carrier approaches the first pair of rollers, one side of the cam comes into contact with the rail 38 and the cam is rotated until the side lies flat on the edge of the rail 38 which extends parallel to the line of travel and thereby holds the pie in alinement. The rollers 36 are spaced to engage opposite edges of the pie and sever the overlying edges of the crust as the pie passes.

When the pie moves beyond the first pair of trimming rolls it is rotated one quarter of a revolution by the lug 39.1 which impinges suitably positioned pins 40 which protrude from the lower surface of the cam 13. The ends of the rails 38 and 39 adjacent the lug 39.1 are spaced to allow the cam to rotate and the succeeding side of the cam is moved into alinement with the rail 39 and consequently the two remaining edges of the pie are engaged by the second pair of rollers. The outer edge of the crust is thereby completely severed and drops onto the disc 10.

When a carrier moves onto the wheel 32, the pie with the pin, is raised out of the holder 34 by means of the plate 41 which normally rests on the disc 10 underneath the pie tin 35 and is attached to the rod 42 which extends loosely through and protrudes below the post 12. The lower end of 42 rides up on the arcuate cam track 43, supported from the frame 26, and raises the pie into the path of the fender 44 which is slidably mounted over the wheel 32 and is continuously driven therefrom in suitable timing relation to contact in succession and move each pie laterally from the holder, to be received by any suitable device which may be provided.

As variously described above the pies are formed on a chain of rotatably mounted carriers which are continuously moving in a path in the same horizontal plane. Near the delivery end the pies are alined with and passed between two pairs of spaced rollers which, since the pies are turned in different relation to each pair of rollers, trim the pie and leave the scrap lying on the disc portion of the carrier.

Then the pie is lifted out of the holder and ejected from the machine.

While but one embodiment has been disclosed many details may be altered or omitted without departing from the spirit of the invention.

I claim:

1. In combination in pie making machines having a continuously moving chain of horizontally disposed rotatable pie supports, means for trimming pies comprising stationary trimming members suitably positioned along the path of the holders, means for alining the pies in different positions with respect to each of the several trimming members, and movable means for removing the trimmed pies from the holders.

2. In a pie making machine having a continuously moving chain of horizontally disposed rotatable pie supports, means for trimming pies comprising stationary trimming members suitably positioned along the path of the holders, means for holding the pies in alinement when moving past a trimming member and means for rotating the pies to new positions for succeeding trimming members.

3. In a pie making machine having a continuously moving chain of horizontally disposed rotatable pie supports, means for trimming square pies comprising two pairs of fixedly supported spaced rollers positioned to engage opposite edges of the pies, means for alining the pies when moving between each pair of rollers and means for turning the pies one quarter of a revolution between the two pairs of trimming rollers.

4. In a pie making machine having a continuously moving chain of horizontally disposed rotatable pie supports, means for trimming square pies comprising two pairs of fixedly supported spaced rollers positioned to engage opposite edges of the pies, square cam members and pins on said supports and stationary cam rails adapted to engage with said cams for positioning and holding the pies in alinement with the said rollers and a stationary lug for engaging one of said pins to rotate the pie to a changed position between the two pairs of trimming rollers.

5. In combination in a pie making machine adapted for forming pies upon moving horizontal holders, conveying means for said holders comprising discs mounted on vertical posts, links connecting one post to another hinged directly on and adapted to support the said posts, lateral supporting means comprising fixed rails engaging rollers journaled to said links, end supports comprising horizontal wheels having forks adapted to engage and support said posts, and means for turning one of said wheels.

6. In combination in a pie machine, a moving conveyor chain having vertical joint pins, a track for supporting and guiding said chain, a pie support rotatably mounted in each of several of said joint pins and having a square cam and a square pie holder mounted thereon in parallel relation to each other, a pair of spaced trimming rollers mounted in a fixed position to engage opposite edges of the pie holders, and a cam rail adjacent the trimming rollers adapted to engage with the cams for alining the pie holder with the rollers.

7. In combination in a pie machine, a moving conveyor chain having vertical joint pins, a track for supporting and guiding said chain, a pie support mounted on each of several of said joint pins, a square cam and a square pie holder mounted in parallel relation on the pie supports, spaced pairs of trimming rollers mounted in a fixed position over the track with the two rollers of each pair positioned to engage opposite sides of the moving pie holders, and a cam rail for each pair of trimming rollers adapted to engage with the cams for alining the pie holders with the rollers, and means for turning the holders to a new position for succeeding trimming rolls.

Signed at Chicago this 3rd day of October 1925.

DENNIS W. SMITH.